(12) United States Patent
Zhang

(10) Patent No.: US 11,489,752 B2
(45) Date of Patent: Nov. 1, 2022

(54) FORWARDING ENTRY MONITORING METHOD AND APPARATUS

(71) Applicant: HUAWEI TECHNOLOGIES CO., LTD., Guangdong (CN)

(72) Inventor: Yongkang Zhang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/100,176

(22) Filed: Nov. 20, 2020

(65) Prior Publication Data

US 2021/0075714 A1 Mar. 11, 2021

Related U.S. Application Data

(63) Continuation of application No. PCT/CN2019/085869, filed on May 7, 2019.

(30) Foreign Application Priority Data

May 22, 2018 (CN) .......................... 201810496408.0

(51) Int. Cl.
*H04L 45/02* (2022.01)
*H04L 43/10* (2022.01)

(52) U.S. Cl.
CPC .............. *H04L 45/02* (2013.01); *H04L 43/10* (2013.01)

(58) Field of Classification Search
CPC .................................. H04L 45/02; H04L 43/10
See application file for complete search history.

(56) References Cited

U.S. PATENT DOCUMENTS

2003/0204786 A1* 10/2003 Dinker ................... H04L 45/22
714/43
2010/0254397 A1 10/2010 Nishi
(Continued)

FOREIGN PATENT DOCUMENTS

CN 101102272 A 1/2008
CN 101521927 A 9/2009
(Continued)

OTHER PUBLICATIONS

T. Eckert, Ed. et al,"Using an Autonomic Control Plane for Stable Connectivity of Network Operations, Administration, and Maintenance (OAM)", Internet Engineering Task Force (IETF), RFC 8368, May 2018, total 24 pages.
(Continued)

*Primary Examiner* — Jonathan A Bui
*Assistant Examiner* — Kidest Mendaye
(74) *Attorney, Agent, or Firm* — Womble Bond Dickinson (US) LLP

(57) ABSTRACT

This application discloses a forwarding entry monitoring method and apparatus, to quickly determine a changed forwarding entry, thereby improving locating efficiency. The method includes: determining, by a first node, a monitored data stream; determining, by the first node, that a stored forwarding entry changes, where the forwarding entry is used to forward the data stream; and sending, by the first node, a first packet to a second node. The second node is
(Continued)

located on a transmission path of the data stream, and the second node is a previous-hop node of the first node. The first packet carries a change instruction.

14 Claims, 7 Drawing Sheets

(56) References Cited

U.S. PATENT DOCUMENTS

| | | | | |
|---|---|---|---|---|
| 2012/0026891 | A1* | 2/2012 | Kamiya | H04L 41/0677 370/242 |
| 2019/0273727 | A1* | 9/2019 | Eckert | H04L 63/166 |

FOREIGN PATENT DOCUMENTS

| | | |
|---|---|---|
| CN | 101599892 A | 12/2009 |
| CN | 101815140 A | 8/2010 |
| CN | 101873662 A | 10/2010 |
| CN | 102857427 A | 1/2013 |
| CN | 103002489 A | 3/2013 |
| CN | 105812495 A | 7/2016 |
| CN | 108737183 A | 11/2018 |
| CN | 110324165 A | 10/2019 |
| WO | 2010111956 A1 | 10/2010 |
| WO | 2011080650 A1 | 7/2011 |

OTHER PUBLICATIONS

T. Eckert, Ed et al.,"An Autonomic Control Plane (ACP) draft-ietf-anima-autonomic-control-plane-13", ANIMA WG Internet-Draft, Dec. 17, 2017, total 109 pages.

M. Pritikin et al,"Bootstrapping Remote Secure Key Infrastructures (BRSKI) draft-ietf-anima-bootstrapping-keyinfra-09", ANIMA WG Internet-Draft, Oct. 30, 2017, total 69 pages.

C. Bormann et al.,"A Generic Autonomic Signaling Protocol (GRASP) draft-ietf-anima-grasp-15", Network Working Group Internet-Draft, Jul. 7, 2017, total 81 pages.

M. Behringer, Ed. et al,"A Reference Model for Autonomic Networking draft-ietf-anima-reference-model-05", ANIMA Internet-Draft, Oct. 19, 2017, total 29 pages.

K. Watsen et al.,"Voucher Profile for Bootstrapping Protocols draft-ietf-anima-voucher-06", ANIMA Working Group Internet-Draft, Oct. 25, 2017, total 19 pages.

M. Behringer et al,"Autonomic Networking: Definitions and Design Goals", Internet Research Task Force (IRTF), Request for Comments: 7575, Jun. 2015, total 16 pages.

S. Jiang et al,"General Gap Analysis for Autonomic Networking", Internet Research Task Force (IRTF), Request for Comments: 7576, Jun. 2015, total 17 pages.

J.O. Kephart et al,"The vision of autonomic computing", Published by the IEEE Computer Society, Jan. 2003, total 10 pages.

* cited by examiner

| Transport head | UDP header | | GRASP packet | | | |
|---|---|---|---|---|---|---|
| | DestPort | SrcPort | Request meaasage | Session ID | Objective | |
| | | | | | objective-name | objective-value |
| | | | | | objective-flags | loop-count |

FIG. 5

FORWARDING ENTRY MONITORING METHOD AND APPARATUS

CROSS-REFERENCE TO RELATED APPLICATIONS

This application is a continuation of International Application No. PCT/CN2019/085869, filed on May 7, 2019, which claims priority to Chinese Patent Application No. 201810496408.0, filed on May 22, 2018. The disclosures of the aforementioned applications are hereby incorporated by reference in their entireties.

TECHNICAL FIELD

This application relates to the field of communications technologies, and in particular, to a forwarding entry monitoring method and apparatus.

BACKGROUND

In an autonomic network, a data packet is forwarded through a forwarding entry stored on each node device on a transmission path. The forwarding entry may be a routing table, an ARP/ND table, or the like.

For example, the forwarding entry is a routing table, and a forwarding process of the data packet is as follows:

After receiving a data packet, a node device A first determines a destination IP address of the data packet, and then searches a routing table stored on the node device A, to determine whether the routing table stored on the node device A includes the destination IP address of the data packet. In the routing table of the node device A, each IP address corresponds to a port number. If the routing table stored on the node device A includes the destination IP address of the data packet, the node device A sends the data packet to a port corresponding to the destination IP address. In this way, the data packet is sent to a next-hop node device. The next-hop node device forwards the data packet in a same processing manner as the node device A, until the data packet is sent to a device corresponding to the destination IP address, to complete forwarding of the data packet.

It can be learned that correct execution of a data packet forwarding process depends on a correct forwarding entry. Therefore, once the forwarding entry changes, a service may be interrupted.

In the prior art, when the service is interrupted due to a change of the forwarding entry, an administrator needs to perform operations such as ping segmentation or trace route for a plurality of times, to check connectivity of a transmission path and determine a faulty node device or link. Then, a plurality of forwarding entries on the faulty node device are manually checked, to determine a changed forwarding entry. The operations are complex, and locating efficiency is low.

SUMMARY

Embodiments of this application provide a forwarding entry monitoring method and apparatus, to quickly determine a changed forwarding entry on a transmission path of a data stream, thereby improving fault locating efficiency.

According to a first aspect, an embodiment of this application provides a forwarding entry monitoring method. The method includes: first determining, by a first node, a to-be-monitored data stream; and then sending, after determining that a stored forwarding entry used to forward the data stream changes, a first packet to a second node located on a transmission path of the data stream. The second node is a previous-hop node of the first node. The first packet carries a change indication.

According to the foregoing technical solution, after the forwarding entry, corresponding to the to-be-monitored data stream, that is stored on the first node changes, the first node feeds back a change status to the previous-hop node on the transmission path of the data stream. Therefore, after the transmission path is faulty due to a change of the forwarding entry, the forwarding entry and the node that cause a fault on the transmission path of the data stream may be quickly determined based on the change status of the forwarding entry. This may improve fault locating efficiency.

With reference to the first aspect, in an embodiment, the change indication is used to indicate that the forwarding entry changes, or the change indication is used to indicate changed content in the forwarding entry.

According to the foregoing technical solution, the first node may indicate a change of the forwarding entry in a plurality of manners, to improve system flexibility.

In an embodiment, the first packet further carries a node identifier of the first node and a node identifier of the second node.

According to the foregoing technical solution, the first node may report a path relationship related to the first node to the second node through the first packet.

In an embodiment, the first node sends the first packet to the second node through a first channel different from the transmission path of the data stream.

According to the foregoing technical solution, a channel for sending the first packet is different from a channel of the transmission path of the data stream. In this case, even if the transmission path of the data stream is faulty, the first packet can be successfully transmitted to the second node. This can ensure normal transmission of the first packet.

In an embodiment, the first node receives a second packet from the second node through the transmission path of the data stream, where the second packet is used to obtain status information of the forwarding entry, and the status information is used to indicate whether the forwarding entry changes; and the first node determines the data stream based on a parameter carried in the second packet.

According to the foregoing technical solution, the first node may determine a monitored data stream from the plurality of data streams based on the second packet sent by the second node, to reduce load of the first node.

In an embodiment, the parameter carried in the second packet includes an identifier of the transmission path of the to-be-monitored data stream.

According to the foregoing technical solution, the first node may determine the to-be-monitored data stream based on the identifier, of the transmission path of the to-be-monitored data stream, that is carried in the second packet.

In an embodiment, after the first node sends the first packet to the second node, the first node sends the second packet to a third node through the transmission path of the data stream. The third node is a next-hop node of the first node on the transmission path of the data stream.

According to the foregoing technical solution, the first node may further send the second packet to the next-hop node of the first node. In this way, after the next-hop node receives the second packet, when a forwarding entry, corresponding to the data stream, that is stored on the next-hop node changes, the next-hop node also sends a change status of the forwarding entry to the second node. In this way, the second node may receive change statuses of forwarding entries of all nodes on the transmission path.

In an embodiment, the first node, the second node, and the third node are nodes located in an autonomic networking integrated model and approach (ANIMA) domain.

According to a second aspect, an embodiment of this application provides a forwarding entry monitoring method. The method includes: first receiving, by a second node, a first instruction, where the first instruction instructs the second node to monitor whether a forwarding entry that is on a transmission path of a data stream and that is used to forward the data stream changes, and the first instruction carries an identifier of the transmission path of the data stream; then determining, by the second node, a first node based on a forwarding entry stored on the second node, where the first node is a next-hop node of the second node on the transmission path; and after the first node is determined, sending, by the second node to the first node, a second packet used to obtain status information of a first forwarding entry stored on the first node. The status information is used to indicate whether the forwarding entry changes, and the first forwarding entry is used by the first node to forward the data stream.

According to the foregoing technical solution, the second node may determine, based on the first instruction, the to-be-monitored data stream, and then send, to the next-hop node of the second node on the transmission path of the data stream, the second packet used to obtain a change status of the forwarding entry on the next-hop node. In this way, after the forwarding entry on the next-hop node changes, the second node may obtain the change status. Therefore, after the transmission path is faulty due to a change of the forwarding entry, the second node may quickly determine, based on an obtained change status of the forwarding entry, the forwarding entry and the node that cause a fault. This may improve locating efficiency.

In an embodiment, the second node receives a first packet generated by the first node and/or a third packet generated by a third node. The first packet carries a first change indication, and the first change indication is used to indicate that the first forwarding entry changes. The third packet is used to carry a second change indication, and the second change indication is used to indicate that a second forwarding entry stored on the third node changes. The second forwarding entry is used by the third node to forward the data stream. The third node is a next-hop node of the first node on the transmission path.

According to the foregoing technical solution, after the forwarding entry that is stored on the first node and that corresponds to the monitored data stream changes and/or the forwarding entry that is stored on the third node and that corresponds to the monitored data stream changes, the second node obtains the change status from the first node and/or the third node, to obtain change statuses of forwarding entries on a plurality of nodes of the transmission path. This may improve locating accuracy.

In an embodiment, the second node determines, based on the first packet and/or the third packet, a transmission path used to forward the data stream. The first packet further carries a node identifier of the second node and a node identifier of the first node. The third packet further carries the node identifier of the first node and a node identifier of the third node.

According to the foregoing technical solution, after obtaining the first packet sent by the first node and/or the third packet sent by the third node, the second node may find the transmission path of the data stream based on the node identifier carried in the first packet and/or the third packet.

In an embodiment, the second node determines, based on the first change indication, that the first forwarding entry changes, and determines that the first node is a faulty node on the transmission path; and/or, the second node determines, based on the second change indication, that the second forwarding entry changes, and determines that the third node is a faulty node on the transmission path.

According to the foregoing technical solution, when the second node obtains the first packet from the first node and/or the third packet from the third node, and the transmission path is faulty due to the change of the forwarding entry, the second node may determine that the first node and/or the third node are/is faulty node(s) on the transmission path. This may improve efficiency of locating the faulty node.

In an embodiment, the second node determines, based on the first change indication, that a change of the first forwarding entry meets a preset condition, and outputs, based on the first packet, prompt information used to remind the change; and/or, the second node determines, based on the second change indication, that a change of the second forwarding entry meets a preset condition, and outputs, based on the third packet, prompt information used to remind the change. The preset condition includes a condition under which transmission of the data stream is interrupted.

According to the foregoing technical solution, the second node may generate corresponding prompt information in advance based on a change status of a forwarding entry of a node on the transmission path of the data stream, so that an administrator may perform corresponding processing based on the prompt information, for example, repairing a corresponding node in time. This may improve reliability of data stream transmission.

According to a third aspect, an embodiment of this application provides a forwarding entry monitoring apparatus. The apparatus may be a first node, or may be an apparatus on the first node. The apparatus may include a processing unit, a storage unit, and a sending unit. These units may perform a corresponding function performed by the first node in any design example of the first aspect. Details are as follows:

the processing unit is configured to determine a to-be-monitored data stream, and determine that a forwarding entry stored in the storage unit changes, where the forwarding entry is used to forward the data stream; and the sending unit is configured to send a first packet to a second node, where the second node is located on a transmission path of the data stream, the second node is a previous-hop node of the first node, and the first packet carries a change indication.

In an embodiment, the change indication is used to indicate that the forwarding entry changes, or the change indication is used to indicate changed content in the forwarding entry.

In an embodiment, the first packet further carries a node identifier of the apparatus and a node identifier of the second node.

In an embodiment, the sending unit is specifically configured to send the first packet to the second node through a first channel. The first channel is different from the transmission path of the data stream.

In an embodiment, the apparatus further includes a receiving unit, configured to receive a second packet from the second node through the transmission path of the data stream, where the second packet is used to obtain status information of the forwarding entry, and the status information is used to indicate whether the forwarding entry changes; and the processing unit is specifically configured to determine the data stream based on a parameter carried in the second packet.

In an embodiment, the parameter carried in the second packet includes an identifier of the transmission path of the to-be-monitored data stream.

In an embodiment, the sending unit is further configured to:

send the second packet to a third node, where the third node is a next-hop node of the apparatus on the transmission path of the data stream.

In an embodiment, the apparatus, the second node, and the third node are nodes located in an autonomic networking integrated model and approach (ANIMA) domain.

According to a fourth aspect, an embodiment of this application provides a forwarding entry monitoring apparatus. The apparatus may be a second node, or may be an apparatus on the second node. The apparatus may include a processing unit, a storage unit, a sending unit, and a receiving unit. These units may perform a corresponding function performed by the second node in any design example of the second aspect. Details are as follows:

the receiving unit is configured to receive a first instruction, where the first instruction instructs the apparatus to monitor whether a forwarding entry on a transmission path of a data stream changes, the forwarding entry is used to forward the data stream, and the first instruction carries an identifier of the transmission path of the data stream;

the processing unit is configured to determine a first node based on a forwarding entry stored on the storage unit, where the first node is a next-hop node of the apparatus on the transmission path; and the sending unit is configured to send a second packet to the first node, where the second packet is used to obtain status information of a first forwarding entry stored on the first node, the status information is used to indicate whether the forwarding entry changes, and the first forwarding entry is used by the first node to forward the data stream.

In an embodiment, the receiving unit is further configured to:

receive a first packet generated by the first node and/or a third packet generated by a third node, where the first packet carries a first change indication, the first change indication is used to indicate that the first forwarding entry changes, the third packet is used to carry a second change indication, the second change indication is used to indicate that a second forwarding entry stored on the third node changes, the second forwarding entry is used by the third node to forward the data stream, and the third node is a next-hop node of the first node on the transmission path.

In an embodiment, the processing unit is further configured to:

determine, based on the first packet and/or the third packet, a transmission path used to forward the data stream, where the first packet further carries a node identifier of the apparatus and a node identifier of the first node, and the third packet further carries the node identifier of the first node and a node identifier of the third node.

In an embodiment, the processing unit is further configured to:

determine, based on the first change indication, that a change of the first forwarding entry meets a preset condition, and output, based on the first packet, prompt information used to remind the change, where the preset condition includes a condition under which transmission of the data stream is interrupted; and/or determine, based on the second change indication, that a change of the second forwarding entry meets a preset condition, and output, based on the third packet, prompt information used to remind the change, where the preset condition includes the condition under which transmission of the data stream is interrupted.

In an embodiment, the processing unit is further configured to:

determine, based on the first change indication, that the first forwarding entry changes, and determine that the first node is a faulty node on the transmission path; and/or determine, based on the second change indication, that the second forwarding entry changes, and determine that the third node is a faulty node on the transmission path.

According to a fifth aspect, an embodiment of this application further provides an apparatus. The apparatus includes a processor, configured to implement the methods described in the first aspect. The apparatus may further include a memory, configured to store a program instruction and data. The memory is coupled to the processor. The processor may invoke and execute the program instruction stored in the memory, to implement any one of the methods described in the first aspect. The apparatus may further include a communications interface. The communications interface is used by the apparatus to communicate with another device. For example, the another device is a second node.

In an embodiment, the apparatus includes:

the memory, configured to store a program instruction and a forwarding entry;

the processor, configured to determine a to-be-monitored data stream, and determine that the forwarding entry stored in the memory changes, where the forwarding entry is used to forward the data stream; and the communications interface, configured to send a first packet to the second node, where the second node is located on a transmission path of the data stream, the second node is a previous-hop node of the apparatus, and the first packet carries a change indication.

In an embodiment, the change indication is used to indicate that the forwarding entry changes, or the change indication is used to indicate changed content in the forwarding entry.

In an embodiment, the first packet further carries a node identifier of the apparatus and a node identifier of the second node.

In an embodiment, the communications interface is specifically configured to send the first packet to the second node through a first channel. The first channel is different from the transmission path of the data stream.

In an embodiment, the communications interface is further configured to receive a second packet from the second node through the transmission path of the data stream, where the second packet is used to obtain status information of the forwarding entry, and the status information is used to indicate whether the forwarding entry changes; and the processor is specifically configured to determine the data stream based on a parameter carried in the second packet.

In an embodiment, the parameter carried in the second packet includes an identifier of the transmission path of the to-be-monitored data stream.

In an embodiment, the communications interface is further configured to:

send the second packet to a third node, where the third node is a next-hop node of the apparatus on the transmission path of the data stream.

In an embodiment, the apparatus, the second node, and the third node are nodes located in an autonomic networking integrated model and approach (ANIMA) domain.

According to a sixth aspect, an embodiment of this application further provides an apparatus. The apparatus includes a processor, configured to implement the methods described in the second aspect. The apparatus may further include a memory, configured to store a program instruction and data. The memory is coupled to the processor. The processor may invoke and execute the program instruction stored in the memory, to implement any one of the methods described in the second aspect. The apparatus may further include a communications interface. The communications interface is used by the apparatus to communicate with another device. For example, the another device is a first node.

In an embodiment, the apparatus includes:

the memory, configured to store a program instruction and a forwarding entry;

the communications interface, configured to receive a first instruction, where the first instruction instructs the apparatus to monitor whether a forwarding entry on a transmission path of a data stream changes, the forwarding entry is used to forward the data stream, and the first instruction carries an identifier of the transmission path of the data stream; and the processor, configured to determine the first node based on the forwarding entry stored in the memory, where the first node is a next-hop node of the apparatus on the transmission path.

The communications interface is further configured to send a second packet to the first node. The second packet is used to obtain status information of a first forwarding entry stored on the first node. The status information is used to indicate whether the forwarding entry changes. The first forwarding entry is used by the first node to forward the data stream.

In an embodiment, the communications interface is further configured to:

receive a first packet generated by the first node and/or a third packet generated by a third node, where the first packet carries a first change indication, the first change indication is used to indicate that the first forwarding entry changes, the third packet is used to carry a second change indication, the second change indication is used to indicate that a second forwarding entry stored on the third node changes, the second forwarding entry is used by the third node to forward the data stream, and the third node is a next-hop node of the first node on the transmission path.

In an embodiment, the processor is further configured to:

determine, based on the first packet and/or the third packet, a transmission path used to forward the data stream, where the first packet further carries a node identifier of the apparatus and a node identifier of the first node, and the third packet further carries the node identifier of the first node and a node identifier of the third node.

In an embodiment, the processor is further configured to:

determine, based on the first change indication, that a change of the first forwarding entry meets a preset condition, and output, based on the first packet, prompt information used to remind the change, where the preset condition includes a condition under which transmission of the data stream is interrupted; and/or determine, based on the second change indication, that a change of the second forwarding entry meets a preset condition, and output, based on the third packet, prompt information used to remind the change, where the preset condition includes the condition under which transmission of the data stream is interrupted.

In an embodiment, the processor is further configured to:

determine, based on the first change indication, that the first forwarding entry changes, and determine that the first node is a faulty node on the transmission path; and/or determine, based on the second change indication, that the second forwarding entry changes, and determine that the third node is a faulty node on the transmission path.

According to a seventh aspect, an embodiment of this application further provides a computer-readable storage medium. The computer-readable storage medium stores a computer program. The computer program includes a program instruction. When the program instruction is executed by a computer, the computer is enabled to perform the method according to the first aspect.

According to an eighth aspect, an embodiment of this application further provides a computer-readable storage medium. The computer-readable storage medium stores a computer program. The computer program includes a program instruction. When the program instruction is executed by a computer, the computer is enabled to perform the method according to the second aspect.

According to a ninth aspect, an embodiment of this application further provides a computer program product. The computer program product stores a computer program. The computer program includes a program instruction. When the program instruction is executed by a computer, the computer is enabled to perform the method according to the first aspect.

According to a tenth aspect, an embodiment of this application further provides a computer program product. The computer program product stores a computer program. The computer program includes a program instruction. When the program instruction is executed by a computer, the computer is enabled to perform the method according to the second aspect.

According to an eleventh aspect, an embodiment of this application provides a chip system. The chip system includes a processor, may further include a memory, and is configured to implement the method according to the first aspect. The chip system may include a chip, or may include a chip and another discrete component.

According to a twelfth aspect, an embodiment of this application provides a chip system. The chip system includes a processor, may further include a memory, and is configured to implement the method according to the second aspect. The chip system may include a chip, or may include a chip and another discrete component.

According to a thirteenth aspect, an embodiment of this application provides a system. The system includes the apparatus according to the third aspect and the apparatus according to the fourth aspect.

According to a fourteenth aspect, an embodiment of this application provides a system. The system includes the apparatus according to the fifth aspect and the apparatus according to the sixth aspect.

For beneficial effects of the third aspect to the fourteenth aspect and the embodiments thereof, refer to the descriptions of the beneficial effects of the method according to the first aspect and the second aspect and the embodiments thereof.

BRIEF DESCRIPTION OF DRAWINGS

FIG. 5 is a schematic diagram of an encapsulation manner of a second packet according to an embodiment of this application;

DESCRIPTION OF EMBODIMENTS

The following clearly and entirely describes the technical solutions in the embodiments of this application with reference to the accompanying drawings in the embodiments of this application.

In the following, some terms of the embodiments of this application are described, to help a person skilled in the art has a better understanding.

(1) A data stream is a set of a plurality of data frames or data packets on a same transmission path. The data stream may be represented by an identifier of the transmission path of the data stream. The identifier of the transmission path may include information about each node on the transmission path, or the identifier of the transmission path may include information about only a starting node and a destination node. Certainly, the identifier of the transmission path may alternatively be other information. This is not limited in this embodiment of this application.

(2) A node device may also be referred to as a node. The node may be a forwarder, a switch, a bridge, a gateway, a router, or the like. Alternatively, the node may be a logical or virtual device capable of forwarding a data stream.

(3) An autonomic network is a network system formed by a group of nodes capable of receiving and sending a data stream. A node in the autonomic network may join or leave the autonomic network at any time, and a network topology of the autonomic network changes at any time as the node joins or leaves. When a node in the autonomic network communicates with a node outside the autonomic network, forwarding needs to be performed through another node in the autonomic network. A solution of the autonomic network may include an autonomic networking integrated model and approach (ANIMA) network. Certainly, with evolution of communications technologies, the solution of the autonomic network may alternatively be another solution. This is not limited herein.

Figure 1:
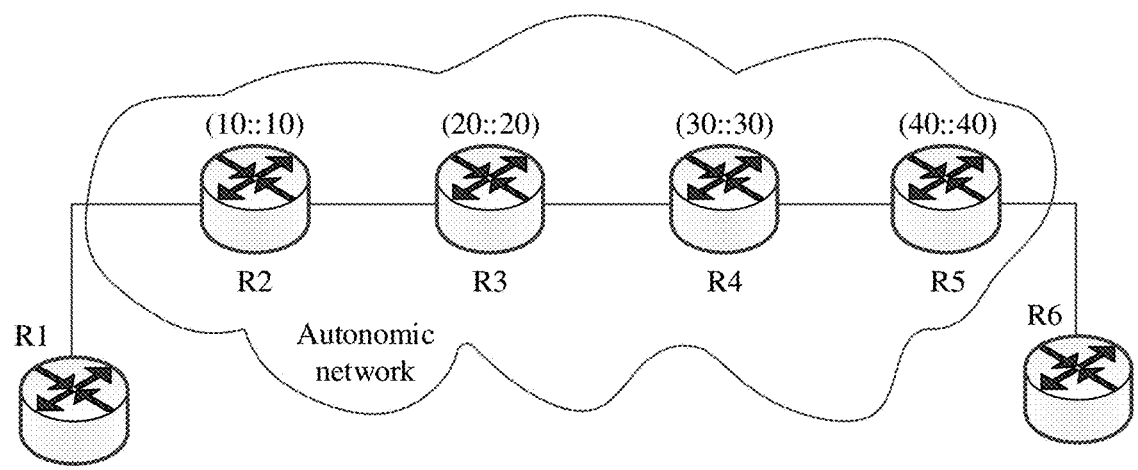
FIG. 1 is a structural diagram of a network according to an embodiment of this application.

(4) A single domain is an autonomic network domain formed by nodes (devices) having a single trust relationship. For example, the autonomic network domain is an ANIMA domain. As shown in FIG. 1, nodes R2 to R5 form an ANIMA domain. There is a single digital certificate authentication server (Registrar) in the ANIMA domain. Certainly, a plurality of Registrars may be actually deployed due to reliability or system performance. These Registrars are equivalent in terms of function, and therefore may be logically considered as one Registrar. In the ANIMA domain, the Registrar issues a domain certificate to the nodes R2 to R5, and the nodes R2 to R5 establish a trust relationship with each other based on the (commonly owned) domain certificate. Therefore, the nodes can freely and securely communicate with each other.

Figure 2:
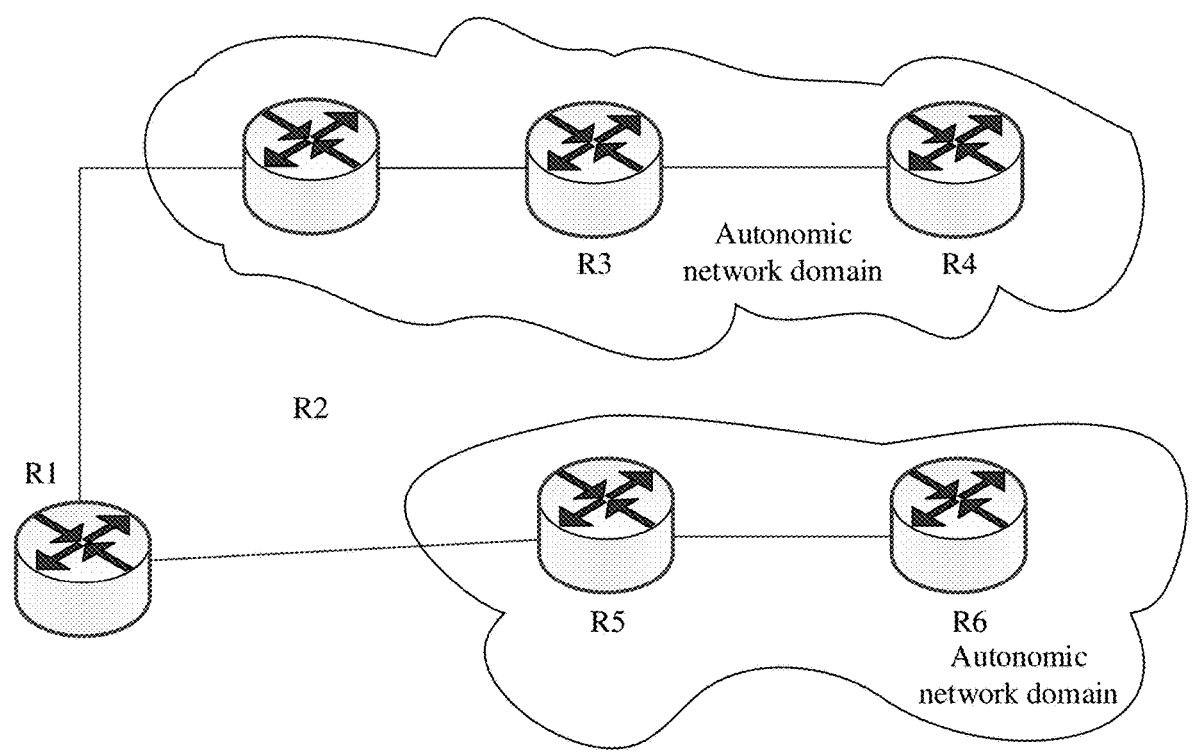
FIG. 2 is a structural diagram of another network according to an embodiment of this application.

(5) A multi-domain is an autonomic network domain formed by a plurality of single domains. For example, the autonomic network domain is an ANIMA domain. As shown in FIG. 2, nodes R2 to R4 form an ANIMA single domain, and nodes R5 and R6 form another ANIMA single domain. The ANIMA network is a multi-domain ANIMA network. The ANIMA domains are managed by different Registrars. For example, the nodes R2 to R4 are managed by a Registrar 1, the nodes R5 and R6 are managed by a Registrar 2. The Registrar 1 and the Registrar 2 use different domain certificates. In this case, the nodes R2 to R4 may communicate with each other based on a domain certificate issued by the Registrar 1, and the nodes R5 and R6 communicate with each other based on a domain certificate issued by the Registrar 2. If a trust relationship needs to be established between a plurality of ANIMA domains, some dedicated mechanisms are further required. These mechanisms are not limited herein.

(6) Ingress node: When a change status of a forwarding entry, on a part of or an entire transmission path of a data stream, needs to be monitored, as shown in FIG. 1, the part of the transmission path, of the data stream, that needs to be monitored is a transmission path corresponding to the nodes R2 to R5, a starting node on the monitored transmission path is an ingress node. For example, the node R2 is the ingress node.

(7) Transmit node: When a change status of a forwarding entry, on a part of or an entire transmission path of a data stream, needs to be monitored, as shown in FIG. 1, the part of the transmission path, of the data stream, that needs to be monitored is the transmission path corresponding to the nodes R2 to R5, an intermediate node on the monitored transmission path is a transmit node. For example, the nodes R3 and R4 are transmit nodes.

(8) Egress node: When a change status of a forwarding entry, on a part of or an entire transmission path of a data stream, needs to be monitored, as shown in FIG. 1, the part of the transmission path, of the data stream, that needs to be monitored is the transmission path corresponding to the nodes R2 to R5, an end node on the monitored transmission path is an egress node. For example, the node R5 is the egress node.

(9) Target node: For a data stream, an end node of a transmission path of the data stream is a target node. When the end node of the transmission path of the data stream is the same as an end node of a monitored transmission path, for example, as shown in FIG. 1, the transmission path of the data stream and a to-be-monitored transmission path are the transmission path corresponding to the nodes R2 to R5, the target node is an egress node. When the end node of the transmission path of the data stream is different from the end node of the monitored transmission path, for example, the transmission path of the data stream is a transmission path corresponding to nodes R1 to R6, and the to-be-monitored transmission path is the transmission path corresponding to the nodes R2 to R5, the target node is the node R6, and the egress node is the node R5. Therefore, a destination node is different from the egress node.

It should be noted that the ingress node, the transmit node, and the egress node are associated with the to-be-monitored transmission path. To be specific, when different transmission paths are monitored, corresponding ingress nodes, transmit nodes, and egress nodes may be different. For example, as shown in FIG. 1, when the monitored transmission path is a transmission path corresponding to the nodes R2 to R4, the ingress node is the node R2, the transmit node is the node R3, and the egress node is the node R4 correspondingly. When the monitored transmission path is a transmission path corresponding to the nodes R3 to R5, the ingress node is the node R3, the transmit node is the node R4, and the egress node is the node R5 correspondingly.

(10) A management internet protocol (IP) address is used by another device, such as a server, to use an address connected to another remote login protocol such as a remote terminal protocol (Telnet) or a remote display protocol (RDP). Therefore, after the another device is connected to the node, the node is managed, controlled and the like through the another device.

(11) "A plurality of" refers to two or more than two.

It should be noted that, unless otherwise stated, in the embodiments of this application, ordinal numbers such as "first", "second", "third", and "fourth" are used to distinguish between a plurality of objects, and not intended to limit an order, a time sequence, priorities, or importance of the plurality of objects.

In addition, the term "and/or" in the embodiments of this application describes only an association relationship for describing associated objects and represents that three relationships may exist. For example, A and/or B may represent the following three cases: Only A exists, both A and B exist, and only B exists. In addition, unless otherwise stated, the character "/" in this specification generally indicates an "or" relationship between the associated objects.

In the prior art, when a service is interrupted due to a change of a forwarding entry, an administrator needs to perform operations such as ping segmentation or trace route for a plurality of times, to check connectivity of a transmission path and determine a faulty node device or link. Then, a plurality of forwarding entries on the faulty node device are manually checked, to determine a changed forwarding entry. The operations are complex, and locating efficiency is low.

Based on this, the embodiments of this application provide a forwarding entry monitoring method and apparatus, to quickly determine the changed forwarding entry, thereby improving locating efficiency.

The technical solutions in the embodiments of this application may be applied to various communications networks, such as an NR network, an LTE network, an advanced long term evolution (LTE-A) network, an autonomic network, a next-generation mobile communications system, and the like.

In addition, the technical solutions in the embodiments of this application may be further applicable to a future-oriented communications network. A network described in the embodiments of this application is intended to describe the technical solutions in the embodiments of this application more clearly, and constitutes no limitation on the technical solutions provided in the embodiments of this application. A person of ordinary skill in the art may learn that, with evolution of a network architecture, the technical solutions provided in the embodiments of this application are also applicable to a similar technical problem.

An application scenario of the embodiments of this application is briefly described below.

FIG. 1 is a structural diagram of a network according to an embodiment of this application. An example in which the network is an autonomic network solution, for example, an ANIMA network, is used. The structural diagram shown in FIG. 1 includes six nodes, which are the nodes R1 to R6. The nodes R2 to R5 form a single-domain ANIMA network. The nodes R2 to R5 are located in an ANIMA domain. The nodes R1 and R6 are nodes outside the ANIMA domain.

The following describes the ANIMA network and the nodes in the ANIMA network.

The ANIMA network includes two parts: an autonomic service agent (ASA) and an autonomic networking infrastructure (ANI). The ASA is configured to complete a management task of the ANIMA network, for example, configure a corresponding service or parameter for each node in the ANIMA network. The ANI is an infrastructure platform of the ANIMA network, including a secure bootstrap module configured to complete a node authentication process and allocate an ANIMA domain certificate to a node; an autonomic control plane (ACP) that establishes a hop-by-hop security tunnel with a neighboring node to implement interworking between all nodes in the ANIMA domain; and a generic autonomic signaling protocol (GRASP) running in the ACP.

Figure 3:
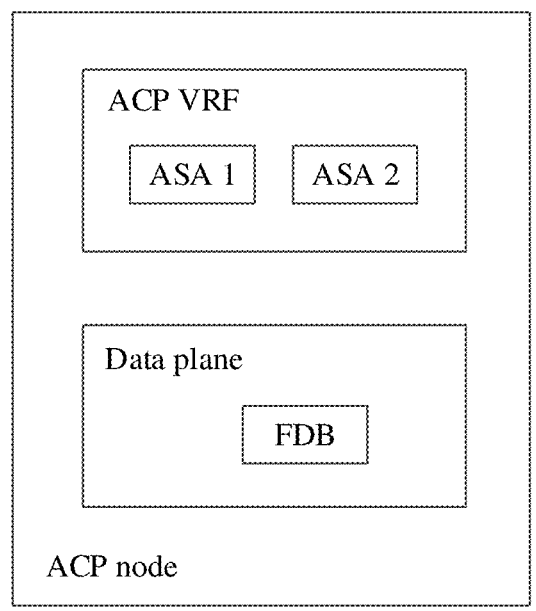
FIG. 3 is a schematic diagram of a running plane of a node in an ANIMA domain according to an embodiment of this application.

The nodes R2 to R5 are nodes in the ANIMA network, and may be referred to as autonomic nodes or ACP nodes. To support a function of the ANIMA network, as shown in FIG. 3, each ACP node includes two running planes: an ACP virtual private network routing and forwarding (VRF) plane and a service plane. The service plane may also be referred to as a data plane. At least one ASA runs on the ACP VRF plane of each ACP node, and each ASA may process a different service. For example, in FIG. 3, the ACP node includes an ASA 1 and an ASA 2. The ASA 1 may process a video-type service of the ACP node. The ASA 2 may process a text-type service and the like of the ACP node. The service plane of the ACP node includes a forwarding database (FDB). The FDB includes various forwarding entries, for example, an IP forwarding entry or a multi-protocol label switching (MPLS) forwarding entry. For ease of description, the ACP VRF plane and the data plane are used as an example in the following description.

The ACP VRF plane of each ACP node is independent of the data plane of the ACP node. In each ACP node, the ACP VRF plane and the data plane of the ACP node may securely access all data of each other. ACP VRF planes and data planes of different ACP nodes have independent transmission channels. For example, a data plane of the node R2 may communicate with a data plane of the node R3 through a first transmission channel. An ACP VRF plane of the node R2 may communicate with an ACP VRF plane of the node R3 through a second transmission channel different from the first transmission channel. In addition, when the data plane of the node R2 is faulty and cannot communicate with the data plane of the node R3, the ACP VRF plane of the node R2 may still communicate with the ACP VRF plane of the node R3 through the second transmission channel. Connectivity of the ACP VRF planes of the different ACP nodes is not associated with connectivity of the data planes of the different ACP nodes.

It should be noted that, for the foregoing content, refer to corresponding content in a standard file, and details are not described herein again. The standard file is draft-ietf-anima-autonomic-control-plane "RFC8368".

In addition, it should be noted that in the application scenario shown in FIG. 1, that the network is an ANIMA network is merely used as an example for description, and should not constitute a limitation on the application scenario of this application. In actual application, another network architecture may be further included. This is not limited in this embodiment of this application.

The following describes the technical solutions provided in the embodiments of this application with reference to the accompanying drawings. In the following description process, the technical solutions provided in this application are applied to the application scenario shown in FIG. 1.

Figure 4:
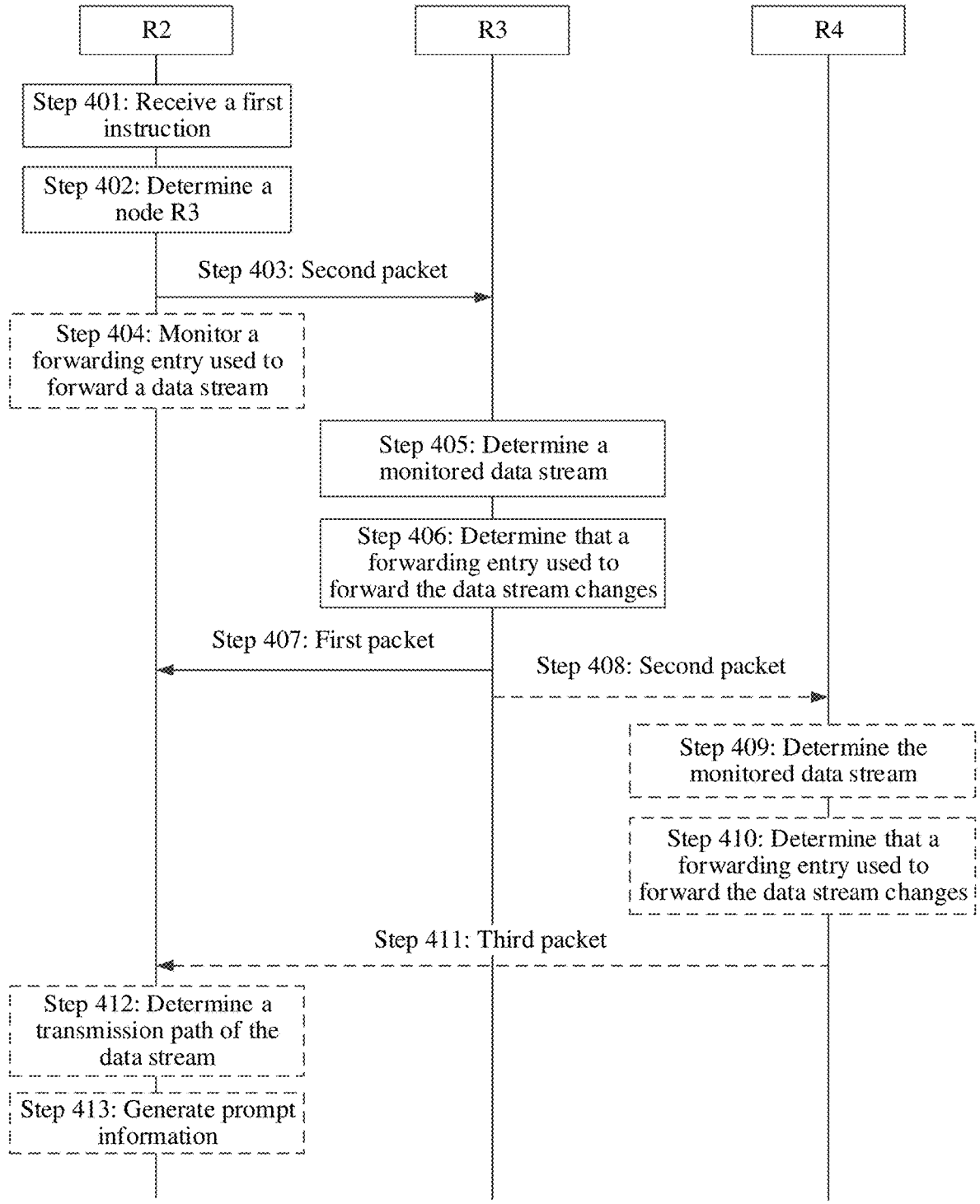
FIG. 4 is a flowchart of a forwarding entry monitoring method according to an embodiment of this application.

FIG. 4 is a flowchart of a forwarding entry monitoring method according to an embodiment of this application. The flowchart is described as follows.

Operation 401: A second node receives a first instruction.

In this embodiment of this application, the first instruction instructs the second node to monitor whether a forwarding entry that is on a transmission path of a data stream and that is used to forward the data stream changes. It should be noted that, the forwarding entry that is on the transmission path and that is used to forward the data stream may be understood as a forwarding entry that is on a node of the transmission path and that is used to forward the data stream, or may be understood as a forwarding entry that is on each node of the transmission path and that is used to forward the data stream. This is not limited herein.

In this embodiment of this application, the second node is an ingress node of a to-be-monitored transmission path. For ease of description, the second node is the node R2 shown in FIG. 1.

Specifically, an embodiment of operation 401 may include but is not limited to the following two manners:

Manner 1:

Before operation 401, an administrator sets names and passwords for the six nodes in the network shown in FIG. 1 through an operation and maintenance (OM) interface, for example, a command line, a graphical interface, or a dos interface. The name may be a sequence number of each node, for example, 01, 02, 03, or the like. Alternatively, the name may be another name set by the administrator for each node. This is not limited herein. The passwords for the nodes may be the same or different. In this way, the administrator can enter a name and a password of a node in the OM interface to log in to the node as required. Certainly, the names and the passwords of the nodes may alternatively be automatically generated by a network. This is not limited herein.

When the administrator needs to monitor whether the forwarding entry on the transmission path of the data stream changes, the administrator may log in to one node on the transmission path through the OM interface, for example, a starting node R2 on the transmission path; enter a name and a password of the starting node R2 through the OM interface; log in to the starting node R2; and output the first instruction to the node R2. The first instruction carries an identifier of the transmission path of the monitored data stream, so that the node R2 can perform a corresponding operation according to the first instruction.

Because the first instruction is entered by the administrator after the administrator logs in to one node on the transmission path, in this manner, a process of monitoring whether the forwarding entry on the transmission path changes does not depend on a network management system (NMS), and can be implemented easily.

Manner 2:

To ensure correct transmission of the data stream, before determining that the data stream needs to be sent, the NMS may query whether the forwarding entry on the transmission path of the data stream changes. In this manner, the NMS may directly send the first instruction to the starting node R2 on the transmission path.

In this embodiment of this application, the first instruction may include the following parameters.

(1) An operation type, which may be an operation type of subscribing whether the forwarding entry on the transmission path of the data stream changes. Specifically, a plurality of operation types may be preconfigured for each node in an ANIMA domain. For example, the plurality of operation types may include the operation type of subscribing whether the forwarding entry on the transmission path of the data stream changes, an operation type of obtaining a forwarding entry on a specified node, and an operation type of obtaining a status of an outbound interface of a specified node. The specified node may be set by the administrator or the NMS. Each operation type corresponds to a sequence number. To be specific, the operation type of subscribing whether the forwarding entry on the transmission path of the data stream changes corresponds to a sequence number 00; the operation type of obtaining the forwarding entry on the specified node corresponds to a sequence number 01; and the operation type of obtaining the status of the outbound interface of the specified node corresponds to a sequence number 10. In this embodiment of this application, if the operation type is the operation type of subscribing whether the forwarding entry on the transmission path of the data stream changes, a parameter value of the operation type is 00. Certainly, the parameter value of the operation type may alternatively be other content. This is not limited herein.

(2) An identifier and/or an egress node of the transmission path of the data stream. The identifier of the transmission path of the data stream may be a target node of the data stream. For example, an index number of the target node of the data stream may be used to indicate the target node. For example, if the target node is the node R4, the index number is 4. Alternatively, an address, of the target node of the data stream, in the forwarding entry may be used to indicate the target node. For example, when a forwarding model of the ANIMA domain is an IP forwarding model, an IP address of the target node may be used to indicate the target node. When the forwarding model is a multi-protocol label switching (MPLS) forwarding model, the IP address of the target node and a label in a LABEL table may be used to indicate the target node. Certainly, if another forwarding model is used for the ANIMA domain, corresponding content is correspondingly used to indicate the target node. Details are not described herein again.

When the egress node may be the same as the target node of the data stream, only the target node of the data stream may be indicated. When the egress node is different from the target node of the data stream, the target node and the egress node may be separately indicated. Certainly, the egress node may alternatively be determined by a node in the ANIMA domain based on the target node of the data stream. For example, in the network shown in FIG. 1, the target node of the data stream is the node R6. When only the node R6 is set as the target node, because the node R5 is an edge node in the ANIMA domain, the node R5 is automatically determined as an egress node.

(3) An operation flow control parameter, which may include a quantity of nodes that perform an operation, a timeout period of the operation, a sending interval of a packet used to indicate the operation to each node on the transmission path, an encapsulation parameter of the packet used to indicate the operation to each node on the transmission path, and the like.

(4) A feedback output control parameter, which may include a detail of a change of a forwarding entry fed back by each node on the transmission path to the node to which the administrator logs in. For example, the detail may include a detail of feeding back whether the change occurs, a detail of feeding back whether the change occurs and feeding back changed content, or the like. The detail may further include an output control parameter of information carried in a packet used to feedback whether the forwarding entry changes. For example, the detail displays system time at which the packet used to feedback whether the forwarding entry changes is sent, an inbound interface of the packet, and the like. The detail may further include whether to record error information in a cache or whether to record content of the packet used for feedback in a log file.

It should be noted that the parameters included in the first instruction include at least the identifier of the transmission path of the data stream. If the first instruction includes only the identifier of the transmission path of the data stream and does not include another parameter, the starting node R2 may determine a value of the another parameter based on content stipulated in a protocol or preconfigured content. A specific determining manner is not described herein again.

Operation 402: The second node determines a first node.

After receiving the first instruction, the node R2 queries a local FDB through an ASA on an ACP VRF plane, to obtain a forwarding entry stored on the node R2. For example, the forwarding entry is an IP routing entry. In this embodiment of this application, each node in the ANIMA domain has an ACP VRF plane and a data plane, and the ACP VRF plane and the data plane have independent forwarding planes. Therefore, each node in the ANIMA domain has two addresses. One is a unique local IPv6 unicast address (ULA) corresponding to the ACP VRF plane of the node, and the other is a management IP address corresponding to the data plane of the node, as shown in Table 1. In Table 1, each node has one ACP ULA address and one management IP address.

TABLE 1

| R1 | ACP ULA | FDA3:79A6 :F6EE::1 |
| | Data plane management IP address | 10::10 |
| R2 | ACP ULA | FDA3:79A6 :F6EE::2 |
| | Data plane management IP address | 20::20 |
| R3 | ACP ULA | FDA3:79A6 :F6EE::3 |
| | Data plane management IP address | 30::30 |
| R4 | ACP ULA | FDA3:79A6 :F6EE::4 |
| | Data plane management IP address | 40::40 |

The IP routing entry is shown in Table 1. An address in Table 1 is a data plane management IP address. It can be learned from Table 1 that a next-hop node of the node R2 is the node R3, and the node R3 is connected to an interface Eth2. Therefore, the node R2 determines, based on the IP routing table, that the first node is the node R3. In this embodiment, the first node is the node R3.

TABLE 2

| Destination address | Prefix length | Next hop | Outbound interface |
| --- | --- | --- | --- |
| (40::40) | 64 | R3 | Eth2 |
| (30::30) | 64 | R3 | Eth2 |
| (20::20) | 64 | R3 | Eth2 |

Operation 403: The second node sends a second packet to the first node, and the first node receives the second packet.

In this embodiment of this application, the second packet is used to obtain status information of a first forwarding entry, stored on the first node, that is used to forward the data stream. The status information is used to indicate whether the forwarding entry changes.

After the node R2 determines that the next-hop node is the node R3, the ASA of the second node generates, based on the parameters in the first instruction, the second packet sent to the node R3. The following describes an encapsulation format of the second packet.

In an example, as shown in FIG. 5, the encapsulation format of the second packet is divided into three parts: a transport header, a user datagram protocol header (UDP header), and a GRASP packet.

The ASA of the second node may determine a specific format of the transport header based on a forwarding model of the ANIMA network. For example, if the forwarding model of the ANIMA network is a native IP forwarding model, such as a Native IPv4 forwarding model or a Native IPv6 forwarding model, the ASA may use an encapsulation header of an internet protocol version 4 (IPv4) or an encapsulation header of an internet protocol version 6 (IPv6). If the forwarding model of the ANIMA network is an internet protocol tunnel (IP tunnel) forwarding model, the ASA may use an encapsulation header of IP in IP or an encapsulation header of a combination of an IP protocol and a generic routing encapsulation (GRE) protocol. If the forwarding model of the ANIMA network is an MPLS forwarding model, the ASA may use an encapsulation header of a combination of a multi-protocol label stack (MPLS label stack) and the IP protocol. If the forwarding model of the ANIMA network is a forwarding model of a virtual extensible local area network (VXLAN), the ASA may use a combination of a VXLAN tunnel header, an Eth header, and an IP header.

The UDP_Header includes a destination port (DestPort) and a source port (SrcPort). The DestPort is a listening port of a GRASP, and is (referred to as a well-known port) generally uniformly allocated by an internet assigned numbers authority (IANA). For details, refer to descriptions in section 6 of the standard document draft-ietf-anima-grasp-15. The SrcPort may be randomly allocated by the ASA. A range of the port number varies due to different embodiments by different vendors or some different configuration commands. Generally, the range is [1025, 65535], and the range may be set based on an actual situation. This is not limited herein.

The GRASP packet includes a synchronization request message field, a session ID field, and an objective field. A value of the synchronization request message field may be a synchronization request message in a synchronization mechanism of the GRASP. A value of the session ID field is randomly allocated by the ASA of the second node to the second packet, and is used to identify the second packet. The objective field includes an objective-name field, an objective-flags field, a loop-count field, and an objective-value field.

The following describes the objective field.

The objective-name is an objective name of the second packet, and is used to uniquely identify and manage the second packet. The objective-name may be formed by characters in a unicode transformation format (UTF-8). A length of the characters is not limited in this embodiment of this application. The objective-name may be classified into two types: a standard name and a private name. The standard name is allocated by the IANA. The private name may be defined by the ASA of the second node. For example, the ASA may define the private name as " huawei.com:PathStatusSubcribe". It should be noted that the private name includes at least one ":".

The objective-flags is used to indicate the operation type in the first instruction. For example, a plurality of operation types may include the operation type of subscribing whether the forwarding entry on the transmission path of the data stream changes, the operation type of obtaining the forwarding entry on the specified node, and the operation type of obtaining the status of the outbound interface of the specified node. In this embodiment of this application, the operation type is the operation type of subscribing whether the forwarding entry on the transmission path of the data stream changes, and may be marked as F_SYNCH. In this case, a value of the objective-flags may be F_SYNCH.

The loop-count is used to avoid an infinite loop of an operation. A value of the field is obtained from the operation flow control parameter in the first instruction, and the value of the loop-count may be associated with a destination address of the monitored data stream. For example, the destination address is (40::40), but an address of the second node R2 is (10::10). In this case, a maximum of three nodes exist between the second node R2 and a node corresponding to the destination address, so that the loop-count may be set to 3. Certainly, the loop-count may alternatively be set to another value. This is not limited herein.

The objective-value field includes an address field of an ingress node of the monitored data stream, an address field of a current node, an information field related to the transmission path of the monitored data stream, and a control flag field. These fields are respectively marked as ingress, current, path-info, and control-flags. A value of each piece of content in the field is obtained based on the identifier and the egress node of the transmission path of the data stream, the operation flow control parameter, and the feedback output control parameter in the first instruction. Each node in the ANIMA domain corresponds to two addresses: the ACP ULA and the data plane management IP address. Therefore, both the ingress field and the current field include an ACP ULA address and a management IP address of a corresponding node, and specific values are not described herein again.

The path-info field includes a path type field, a path status field, and a path keyword field, and these fields are respectively marked as path-type, path-status, and path-keys. The path-status is used to identify a state of a path. For example, a value of the path-status may be a continued state, a sub-branch state, a broken state, a terminated state, or the like. The path-keys is a key field that identifies a path instance. A specific value of the path-keys varies based on path-type.

The control-flags may include the following flags:

(1) A transit flag, which may be marked as CF_TRANSIT. The flag is used to indicate whether a node on the transmission path needs to forward the second packet to a next-hop node when the node does not support the objective. A value of the CF_TRANSIT being 0 indicates that the node may not forward the second packet to the next-hop node. The value of CF_TRANSIT being 1 indicates that the node must forward the second packet to the next-hop node.

(2) An all-subpath flag, which may be marked as CF_ALL_SUBPATH. The flag is used to indicate, if a node on the transmission path finds a plurality of next-hop nodes, whether the node needs to replicate and forward the second packet to all the next-hop nodes. A value of the CF_ALL_SUBPATH being 0 indicates that the node may not replicate and forward the second packet to all the next-hop nodes, but selects one next-hop node through a hash algorithm. The value of the CF_ALL_SUBPATH being 1 indicates that the node must replicate the second packet and forward the second packet to all the next-hop nodes.

(3) An operation type, which may be marked as op-type. In this embodiment of this application, the op-type may be set to a query type.

(4) A timeout, which may be marked as timeout. In this embodiment of this application, the timeout may be set to 0.

(5) A forwarding entry change type, which may be marked as type. The forwarding entry change type may be as follows:

a) a path broken type, which may be marked as SUBFLAG_PATH_BROKEN;

b) when a primary path and a secondary path are set for the transmission path, a type of switching to the secondary path according to a fast reroute (FRR) method due to a fault or deletion of the primary path, where the type may be marked as SUBFLAG_PATH_FRR_SWITCH;

c) when the primary path and the secondary path are set for the transmission path, a type of which the primary path remains unchanged, but a status of the secondary path changes, where the type may be marked as SUBFLAG_PATH_FRR_SLAVE_CHANGE;

d) a change type of an outbound interface status, where the type may be marked as SUBFLAG_PATH_OUTIF_STATE_CHANGE;

e) a change type of a bidirectional forwarding detection (BFD) status associated with the transmission path, where the type may be marked as SUBFLAG_PATH_BFD_STATE_CHANGE; and f) a modification type of a maximum transmission unit (MTU) of an outbound interface, where the type may be marked as SUBFLAG_PATH_MTU_CHANGE.

After the node R2 generates the second packet based on the encapsulation format of the second packet and the parameters included in the first instruction, the node R2 sends the second packet to the next-hop node R3.

To ensure that another node can receive the second packet, in this embodiment of this application, the second packet is forwarded through a transmission channel for transmitting the data stream, for example, a channel of a data plane of the R2 node. The data stream is also transmitted on the data plane, and it can be learned from the description of the encapsulation format of the second packet that the encapsulation format of the second packet is similar to an encapsulation format of the data stream. Therefore, when the second packet is forwarded in the ANIMA domain, each node may forward the second packet through the transmission path for transmitting the data stream, to ensure high fitting between a transmission path of the second packet and the transmission path of the data stream.

In addition, it should be noted that, because the second packet is forwarded through the data plane, and it may be learned from FIG. 3 that the ASA used to process a service on each node is located on the ACP VRF plane above the data plane, a hop-by-hop sending mechanism further needs to be set in the second packet. For example, a time to live (TTL) field of an IPv4/IPv6 packet, a (hop-limit) field of a quantity of hops allowed during packet forwarding, a router alert field, or a label alert field or a control word of an MPLS packet may be used for setting. In this way, after receiving the second packet, the another node can send the second packet to the ACP VRF plane through the data plane based on an indication of the field.

Operation 404: The second node monitors a forwarding entry that is stored on the second node and used to forward the data stream.

Specifically, after receiving the first instruction, the node R2 may also monitor, according to the first instruction, the forwarding entry that is stored on the second node and used to forward the data stream, and determine whether the forwarding entry that is stored on the node R2 and used to forward the data stream changes. In other words, after determining the data stream to be monitored, the ASA of the node R2 determines, through the local FDB, whether the forwarding entry used to forward the data stream changes.

It should be noted that operation 404 may be performed after operation 403 is completed, or may be performed before operation 403 is performed. Certainly, operation 404 and operation 403 may be performed at the same time. This is not limited herein. In addition, operation 404 is an optional operation. In other words, operation 404 is not mandatory.

Operation 405: The first node determines a to-be-monitored data stream.

After receiving the second packet, the node R3 first reports the second packet to an ACP VRF plane of the node R3 according to the hop-by-hop sending mechanism that is set for the second packet. For example, the hop-by-hop sending mechanism is set based on the TTL field. When a TTL times out, the second packet is reported to the ACP VRF plane of the node R3. Then, an ASA on the ACP VRF plane performs processing such as decapsulation and decoding on the second packet, to obtain control information of the second packet. The control information requires the node R3 to query whether a forwarding entry, on the node R3, related to a transmission path monitored by the second packet changes. It should be noted that, as shown in FIG. 3, each node in the ANIMA domain includes two ASAs. In this case, after receiving the second packet, the node R3 may determine, based on an encapsulation parameter of the second packet, a type of the data stream monitored by the second packet, for example, a video type or a text type, to send the second packet to a corresponding ASA.

The ASA of the node R3 obtains the identifier, carried in the second packet, that is of the transmission path of the data stream, and determines, based on the identifier of the transmission path of the data stream, a to-be-monitored data stream corresponding to the second packet. For example, if the identifier of the transmission path of the data stream is determined based on an IP address (40::40), included in the second packet, of a destination node of the transmission path of the data stream and an inbound interface number Eth1, included in the second packet, of the transmission path of the data stream, the ASA determines the data stream based on the IP address of the destination node and the inbound interface number.

It should be noted that, if a plurality of data streams are corresponding to the IP address of the destination node and the inbound interface number, for example, a video-type data stream 1 and a text-type data stream 2 may be transmitted on a transmission path corresponding to the IP address of the destination node and the inbound interface number, the ASA may further determine, based on the encapsulation parameter of the second packet, the type of the data stream monitored by the second packet. For example, the data stream is determined to be of a video type. In this case, the ASA finally determines that the data stream monitored by the second packet is the data stream 1. Certainly, the ASA may alternatively determine the data stream based on another parameter in the second packet. This is not limited herein.

Operation 406: The first node determines that a stored forwarding entry used to forward the data stream changes.

After determining the data stream to be monitored by the second packet, the ASA of the node R3 determines, through the local FDB, whether the forwarding entry used to forward the data stream changes.

In an example, when the forwarding entry on the node R3 changes, a corresponding modification record may be stored in the FDB. In this case, if the ASA determines that a modification record of the forwarding entry used to forward the data stream is stored in the FDB, the ASA determines that the forwarding entry used to forward the data stream changes. Certainly, the node R3 may alternatively determine, in another manner, that the forwarding entry changes. This is not limited herein.

Operation 407: The first node sends a first packet to the second node, and the second node receives the first packet.

In this embodiment of this application, the first packet carries a change indication. The change indication is used to indicate that the forwarding entry changes. For example, one bit in the first packet is used to indicate whether the forwarding entry changes. A value of the bit being 0 indicates that the forwarding entry does not change, and the value of the bit being 1 indicates that the forwarding entry changes. Alternatively, the change indication is used to indicate changed content in the forwarding entry. For example, the ASA queries the modification record of the forwarding entry in the FDB. After determining that the forwarding entry changes, the ASA may determine modified content based on the modification record. For example, the modification record records that an initial value 32 of an MTU of an outbound interface of the node R3 is modified to 16, so that the changed content of the forwarding entry is carried in the first packet and sent to the node R2. Alternatively, if the modification record stored in the FDB only records that the forwarding entry is modified, but does not indicate the modified content, the node R3 may alternatively add the forwarding entry without modification and a modified forwarding entry to the first packet, and send the first packet to the node R2. The ASA may select a change indication manner based on an actual situation. This is not limited herein.

The following describes an encapsulation format of the first packet.

Figure 6:
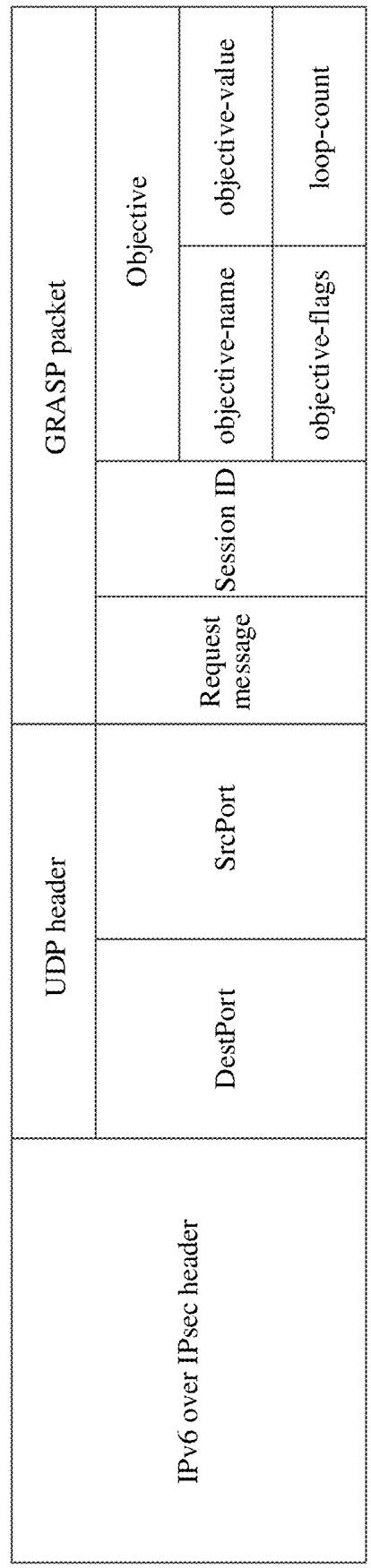
FIG. 6 is a schematic diagram of an encapsulation manner of a first packet according to an embodiment of this application.

In an example, as shown in FIG. 6, the encapsulation format of the first packet is divided into three parts: an IPv6 encapsulation header (IPv6 over IPsec header) based on an internet protocol security (IPsec) mechanism, a UDP header, and a GRASP packet.

The IPv6 over IPsec header may be a Native IPsec encapsulation header, an IPsec with GRE encapsulation header, or the like.

Fields included in the UDP header and the GRASP packet are the same as the fields included in the UDP header and the GRASP packet in the first packet, and content of a synchronization request message field and a session ID field in the GRASP packet is the same as that in the second packet. Details are not described herein again. The following describes an objective field in the GRASP packet.

objective-name, objective-flags, and loop-count are the same as corresponding content in the second packet.

In this embodiment of this application, an objective-value field includes an address field of an ingress node of the monitored data stream, an address field of a previous-hop node of a current node on the transmission path, an address field of the current node, a role field of the current node, an information field related to the transmission path of the monitored data stream, and a forwarding entry change type, and these fields are respectively marked as ingress, upstream, current, role, path-info, and type. Same as the address fields in the second packet, in the first packet, the address fields include an ACP ULA address and a management IP address of a corresponding node. In this embodiment of this application, the current node is the node R3, so that a value of the address field of the current node is an ACP ULA address and a management IP address of the node R3. The previous-hop node of the current node on the transmission path is the node R2, so that a value of the address field of the previous-hop node of the current node on the transmission path is the ACP ULA address and the management IP address of the node R2.

The role field indicates a node type of the current node on the transmission path. The node type may be any one of transit, egress, or target. For example, the ASA of the node R3 queries the FDB to obtain the forwarding entry, on the node R3, that is used to forward the data stream. The forwarding entry is shown in Table 3. There is a next-hop node in Table 3. Because the node R3 receives the second packet from the node R2, the node R3 is not an ingress of the transmission path. Therefore, the ASA of the node R3 determines that a node type of the node R3 is transit.

TABLE 3

| Destination address | Prefix length | Next hop | Outbound interface |
|---|---|---|---|
| (40::40) | 64 | R4 | Eth4 |
| (30::30) | 64 | R4 | Eth4 |

Content included in the path-info field is the same as that in the second packet, and details are not described herein again.

A value of the type field is associated with the second packet and a change status of a forwarding entry of the current node. Specifically, the node R3 obtains, through the first packet, the forwarding entry change type, including: (a) the path broken type; (b) when the primary path and the secondary path are set for the transmission path, the type of switching to the secondary path according to the FRR method due to the fault of deletion of the primary path; (c) when the primary path and the secondary path are set for the transmission path, the type of which the primary path remains unchanged, but the status of the secondary path changes; (d) the change type of the outbound interface status; (e) the change type of the BFD status associated with the transmission path, and (f) the modification type of the MTU of the outbound interface. When determining that a forwarding entry in the FDB changes, the node R3 determines, based on changed content, that a change type is one of the foregoing six types. For example, if the ASA of the node R3 determines that an MTU of an outbound interface of the forwarding entry changes, the ASA of the node R3 determines that the value of the type field is SUB-FLAG_PATH_MTU_CHANGE.

After the node R3 generates the first packet based on the encapsulation format of the first packet, an address of the current node, and the change status of the forwarding entry, the node R3 sends the first packet to a previous-hop node R2.

To prevent a transmission path, of the data plane, that is used to transmit the data stream from being interrupted due to a forwarding entry change, in this embodiment of this application, a first channel different from the transmission channel of the data stream may be used to send the first packet to the second node. For example, the first channel may be a transmission channel of the ACP VRF plane. Because the data plane and the ACP VRF plane have mutually independent channels, it can be ensured that transmission of the first packet is not affected by a fault of the data plane and the first packet can be sent to the second node.

Operation 408: The first node sends the second packet to a third node, and the third node receives the second packet.

In this embodiment of this application, the third node is a next-hop node of the first node on the transmission path of the data stream, namely, the node R4.

Specifically, the ASA of the node R3 queries the FDB to obtain the forwarding entry shown in Table 3. Because the next-hop node R4 exists in the forwarding entry, the ASA of the node R3 forwards, to the node R4, the second packet received from the node R2.

It should be noted that, the node R3 forwards the second packet, in a same manner as the node R2, through the transmission channel for transmitting the data stream, for example, a second channel of the data plane.

Operation 409: The third node determines the monitored data stream.

Operation 410: The third node determines that a stored forwarding entry used to forward the data stream changes.

Operation 411: The third node sends a third packet to the second node, and the second node receives the third packet.

In this embodiment of this application, the third packet is used to carry a second change indication. The second change indication is used to indicate that a second forwarding entry, stored on the third node, that is used by the third node to forward the data stream changes.

It should be noted that the third node may directly send the third packet to the second node, or may forward the third packet through the first node. This is not limited herein. After receiving the second packet, if the third node determines, based on the forwarding entry on the third node, that the third node is an egress node of the transmission path, the third node does not need to forward the second packet.

In this embodiment of this application, an encapsulation format of the third packet is the same as that of the first packet. Specific content in the third packet is generated based on a change status of the forwarding entry, and specific operations may be the same as corresponding content in the first packet. The second change indication is the same as the first change indication. Operation 408 to operation 410 are the same as operation 404 to operation 406. Details are not described herein again.

In addition, it should be noted that operation 407 to operation 410 are optional operations. In other words, operation 407 to operation 410 are not mandatory. For example, the first node determines that the first node is a termination node of the transmission path. In this case, operation 407 to operation 410 do not need to be performed. In FIG. 4, an example in which operation 407 to operation 410 are performed is used. In this embodiment of this application, an execution sequence of operation 406 and operation 407 to operation 410 is not limited. To be specific, operation 407 to operation 410 may be performed before operation 406, or operation 406 and operation 407 to operation 410 may be performed at the same time.

Operation 412: The second node determines, based on the first packet and/or the third packet, the transmission path used to forward the data stream.

In the example in which operation 407 to operation 410 are performed in the method in this embodiment of this application, after receiving the first packet, the node R2 determines, based on a node identifier of the second node and a node identifier of the first node that are carried in the first packet, that a part of the transmission path of the data stream is the node R2→ the node R3. The node identifier may be an ACP ULA address of the node and/or a data plane management IP address of the node. Then, the node R2 determines, based on the node identifier of the first node and a node identifier of the third node that are carried in the third packet, that a part of the transmission path of the data stream is the node R3→ the node R4, and a role of the third node in the third packet is target, thereby obtaining that the transmission path of the data stream is: the node R2→ the node R3→ the node R3→ the node R4. In this way, based on a packet returned by each node on the transmission path, the second node restores the transmission path of the data stream, implements path discovery, and obtains a change status of a forwarding entry on the transmission path. In this way, when a fault that the data stream cannot be forwarded due to the forwarding entry occurs on the transmission path, the first node may quickly determine that a node on which a forwarding entry changes may be a faulty node. This may improve locating efficiency.

Operation 413: The second node generates prompt information.

After the node R2 receives the first packet, the node R2 obtains a change indication in the first packet in a processing manner such as decapsulation and decoding. For example, the change indication may be the type field in the first packet. Then, the node R2 determines, based on a change type indicated in the type field, whether a change of the forwarding entry on the node R3 causes interruption during the transmission of the data stream. For example, the change type indicated in the type field is the path broken type or the modification type of the MTU of the outbound interface. In this case, the change of the forwarding entry may cause a failure to transmit the data stream. Therefore, the node R2 may output corresponding prompt information, for example, may output an alert through screen printing, or report the change to the NMS through a simple network management protocol (SNMP).

If the node R2 determines that the change type of the forwarding entry on the node R3 is the type of which the primary path remains unchanged, but the status of the secondary path changes when the primary path and the secondary path are set for the transmission path, or the change type of the outbound interface status, the change of the forwarding entry does not cause the failure to transmit the data stream. Therefore, the node R2 may record the change status through a syslog function.

The node R2 processes the received third packet in the foregoing same manner. Details are not described herein again.

It should be noted that, if the node R2 monitors the forwarding entry that is stored on the node R2 and used to forward the data stream, and determines that the forwarding entry stored on the node R2 also changes, the node R2 also needs to perform the foregoing processing on the changed forwarding entry of the node R2. Details are not described herein again.

It should be noted that operation 408 to operation 413 are optional operations. In other words, operation 408 to operation 413 are not mandatory.

In addition, it should be noted that some names such as the ACP VRF plane and the data plane are described by using a current ANIMA network as an example, and may change with network evolution. For specific evolution, refer to descriptions in a corresponding standard. In addition, when the foregoing technical solution is applied to another network, the ACP VRF plane, the data plane, or the like are corresponding to a module, a virtual component, or the like that has a corresponding function in the another network.

According to the foregoing technical solution, when a forwarding entry on a node of the transmission path of the data stream changes, the node may report a change to a previous-hop node on the transmission path. Therefore, in this way, a node on the transmission path can obtain a change status of the forwarding entry on the transmission path. In this way, when the fault that the data stream cannot be forwarded due to the forwarding entry occurs on the transmission path, the first node may quickly determine that the node on which the forwarding entry changes may be the faulty node. This may improve locating efficiency.

In the foregoing embodiments provided in this application, the method provided in the embodiments of this application is described separately from perspectives of the first node, the second node, and interaction between the first node and the second node. To implement functions in the method provided in the embodiments of this application, the first node and the second node may include a hardware structure and/or a software module, and implement the functions in a form of the hardware structure, the software module, or a combination of the hardware structure and the software module. Whether a function of the functions is performed by the hardware structure, the software module, or the combination of the hardware structure and the software module depends on a specific application and a design constraint condition of the technical solution.

Figure 7:
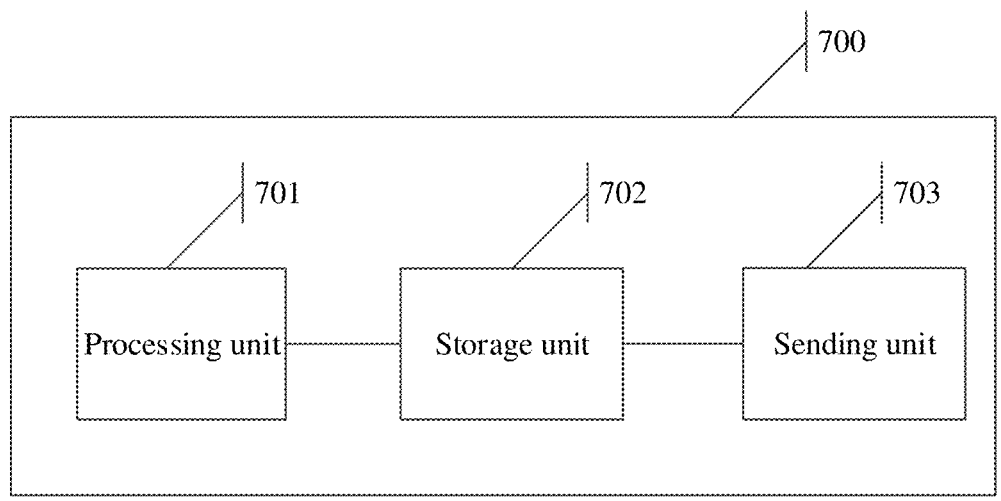
FIG. 7 is a schematic structural diagram of a forwarding entry monitoring apparatus according to an embodiment of this application.

FIG. 7 is a schematic structural diagram of a forwarding entry monitoring apparatus 700. The forwarding entry monitoring apparatus 700 may be a first node, and can implement a function of the first node in the method provided in the embodiments of this application. Alternatively, the forwarding entry monitoring apparatus 700 may be an apparatus that can support the first node in implementing the function of the first node in the method provided in the embodiments of this application. The forwarding entry monitoring apparatus 700 may be a hardware structure, a software module, or a combination of a hardware structure and a software module. The forwarding entry monitoring apparatus 700 may be implemented as a chip system. In this embodiment of this application, the chip system may include a chip, or may include a chip and another discrete component.

The forwarding entry monitoring apparatus 700 may include a processing unit 701, a storage unit 702, and a sending unit 703.

The processing unit 701 may be configured to perform operation 404 or operation 405 in the embodiment shown in FIG. 4, and/or configured to support another process of the technology described in this specification.

The storage unit 702 may be configured to store the forwarding entry in operation 405 in the embodiment shown in FIG. 4, and/or configured to support another process of the technology described in this specification.

The sending unit 703 may be configured to perform operation 406 or operation 407 in the embodiment shown in FIG. 4, and/or configured to support another process of the technology described in this specification. The sending unit 703 is used by the forwarding entry monitoring apparatus 700 to communicate with another module, and may be a circuit, a component, an interface, a bus, a software module, a transceiver, or any other apparatus that can implement communication.

All related content of the operations in the foregoing method embodiment may be cited in function descriptions of corresponding function modules. Details are not described herein again.

Figure 8:
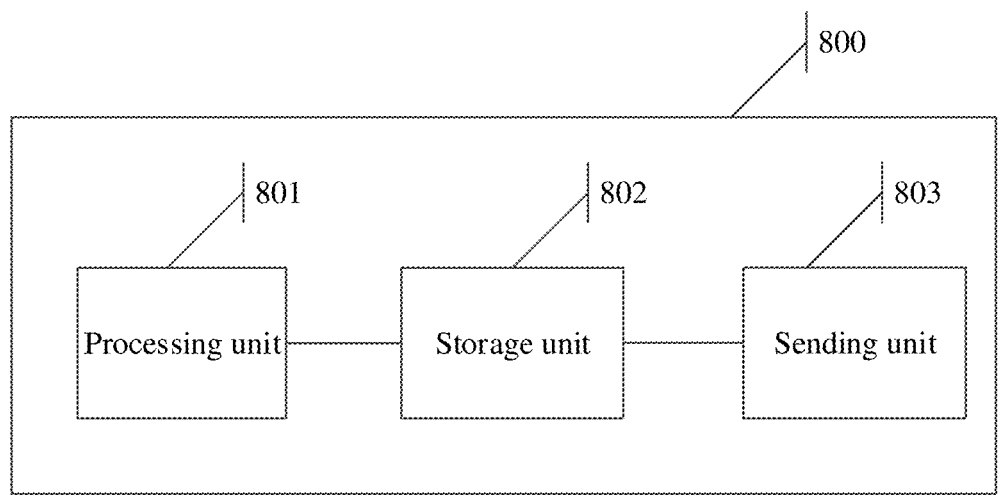
FIG. 8 is a schematic structural diagram of another forwarding entry monitoring apparatus according to an embodiment of this application.

FIG. 8 is a schematic structural diagram of a forwarding entry monitoring apparatus 800. The forwarding entry monitoring apparatus 800 may be a second node, and can implement a function of the second node in the method provided in the embodiments of this application. Alternatively, the forwarding entry monitoring apparatus 800 may be an apparatus that can support the second node in implementing the function of the second node in the method provided in the embodiments of this application. The forwarding entry monitoring apparatus 800 may be a hardware structure, a software module, or a combination of a hardware structure and a software module. The forwarding entry monitoring apparatus 800 may be implemented as a chip system. In this embodiment of this application, the chip system may include a chip, or may include a chip and another discrete component.

The forwarding entry monitoring apparatus 800 may include a processing unit 801, a storage unit 802, and a sending unit 803.

The processing unit 801 may be configured to perform any one of operation 402, operation 411 and operation 412 in the embodiment shown in FIG. 4, and/or configured to support another process of the technology described in this specification.

The storage unit 802 may be configured to store the forwarding entry in operation 402 in the embodiment shown in FIG. 4, and/or configured to support another process of the technology described in this specification.

The sending unit 803 may be configured to perform operation 403 in the embodiment shown in FIG. 4, and/or configured to support another process of the technology described in this specification. The sending unit 803 is used by the forwarding entry monitoring apparatus 800 to communicate with another module, and may be a circuit, a component, an interface, a bus, a software module, a transceiver, or any other apparatus that can implement communication.

All related content of the operations in the foregoing method embodiment may be cited in function descriptions of corresponding function modules. Details are not described herein again.

Division into modules in the embodiments of this application is an example, is merely logical function division, and may be other division in an embodiment. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 9:
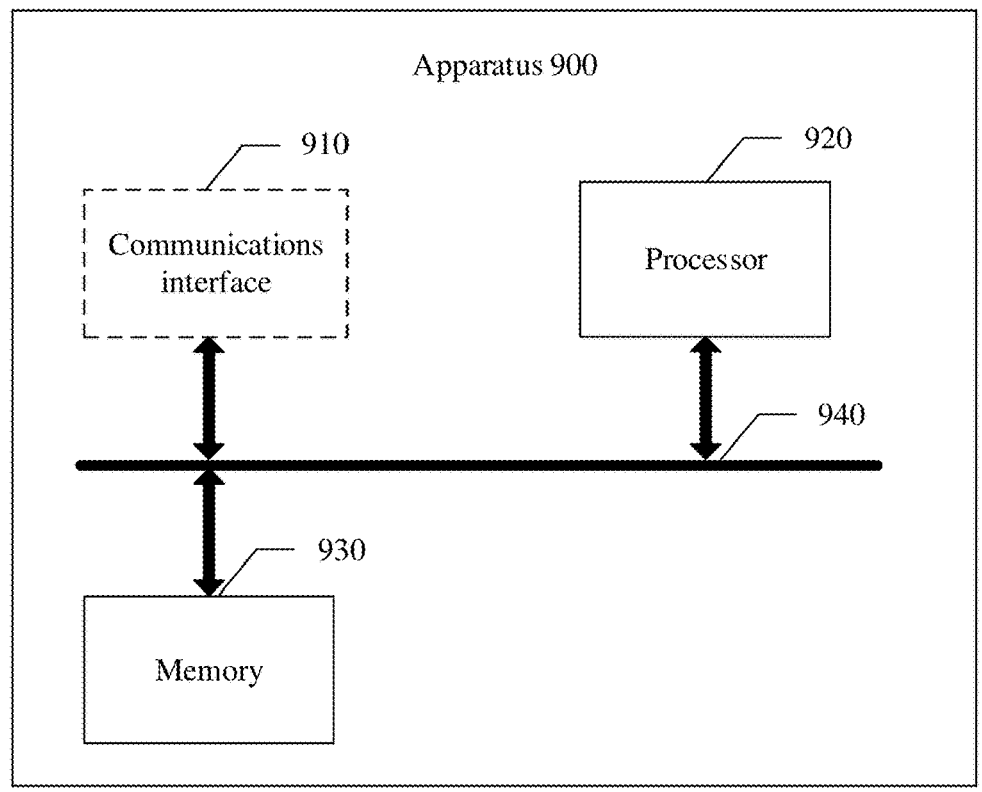
FIG. 9 is a schematic structural diagram of another forwarding entry monitoring apparatus according to an embodiment of this application.

FIG. 9 shows a forwarding entry monitoring apparatus 900 according to an embodiment of this application. The forwarding entry monitoring apparatus 900 may be a first node, and can implement a function of the first node in the method provided in the embodiments of this application. Alternatively, the forwarding entry monitoring apparatus 900 may be an apparatus that can support the first node in implementing the function of the first node in the method provided in the embodiments of this application. The forwarding entry monitoring apparatus 900 may be a chip system. In this embodiment of this application, the chip system may include a chip, or may include a chip and another discrete component.

The forwarding entry monitoring apparatus 900 includes at least one processor 920, configured to implement or support the forwarding entry monitoring apparatus 900 in implementing the function of the first node in the method provided in the embodiments of this application. For example, the processor 920 may determine a monitored data stream and determine that a forwarding entry changes. For example, the processor 920 is configured to determine the monitored data stream based on a received second packet, and the processor 920 is further configured to determine that a stored forwarding entry used to forward the data stream changes. For details, refer to detailed descriptions in the method example. The details are not described herein again.

The forwarding entry monitoring apparatus 900 may further include at least one memory 930, configured to store a program instruction and/or data. The memory 930 is coupled to the processor 920. The coupling in this embodiment of this application is an indirect coupling or a communication connection between apparatuses, units, or modules, may be in an electrical form, a mechanical form, or another form, and is used for information exchange between the apparatuses, the units, and the modules. The processor 920 may operate with the memory 930. The processor 920 may execute the program instruction stored in the memory 930. When executing the program instruction in the memory 930, the processor 920 may implement the function of the first node in the embodiment shown in FIG. 4. At least one of the at least one memory may be included in the processor.

The forwarding entry monitoring apparatus 900 may further include a communications interface 910, configured to communicate with another device through a transmission medium, so that an apparatus in the device monitoring apparatus 900 may communicate with the another device. For example, the another device may be a terminal device. The processor 920 may receive and send data through the communications interface 910, and may implement the method performed by the first node in the embodiment corresponding to FIG. 4.

In this embodiment of this application, a specific connection medium between the communications interface 910, the processor 920, and the memory 930 is not limited. In this embodiment of this application, the memory 930, the processor 920, and the communications interface 910 are connected through a bus 940 in FIG. 9, and the bus is represented by a thick line in FIG. 9. A connection manner between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or a transistor logic device, or a discrete hardware component, and can implement or perform the methods, operations, and logical block diagrams disclosed in the embodiments of this application. The general-purpose processor may be a microprocessor or any conventional processor or the like. The operations of the method disclosed with reference to the embodiments of this application may be directly performed by a hardware processor, or may be performed by a combination of hardware and software modules in the processor.

In this embodiment of this application, the memory 930 may be a non-volatile memory such as a hard disk drive (HDD) or a solid-state drive (SSD), or may be a volatile memory such as a random access memory (RAM). The memory is any other medium that can be configured to carry or store expected program code in a form of an instruction or a data structure and that can be accessed by a computer. However, the memory is not limited thereto. The memory in this embodiment of this application may alternatively be a circuit or any other apparatus that can implement a storage function, and is configured to store the program instruction and/or the data.

Figure 10:
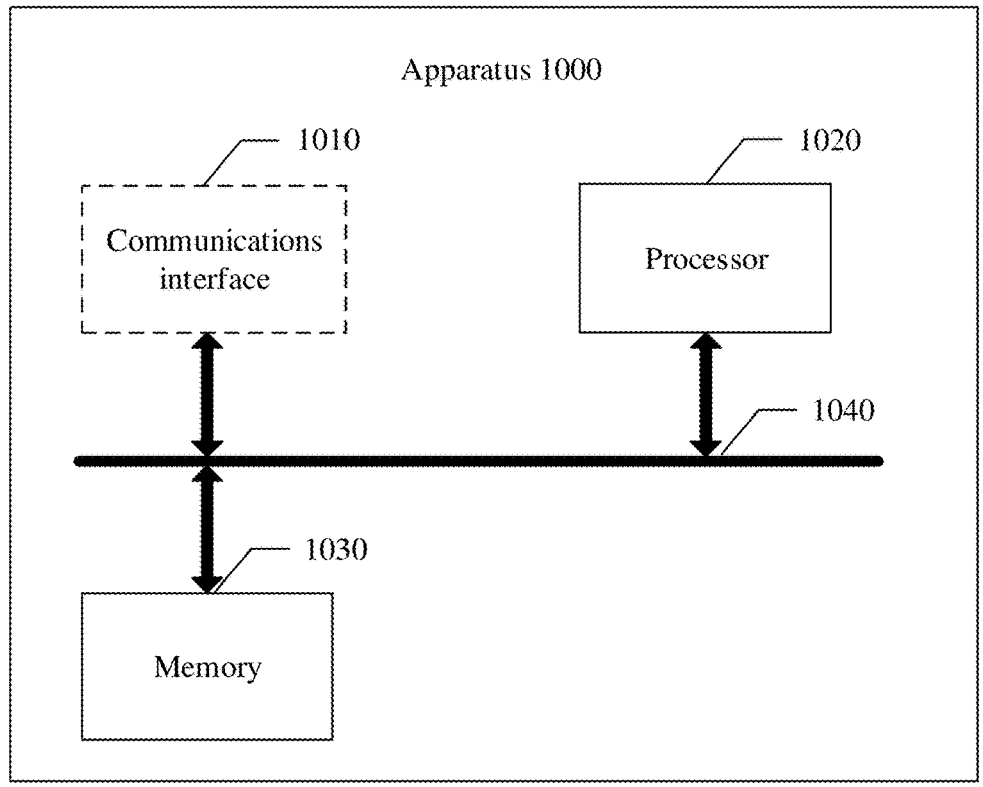
FIG. 10 is a schematic structural diagram of another forwarding entry monitoring apparatus according to an embodiment of this application.

FIG. 10 shows a forwarding entry monitoring apparatus 1000 according to an embodiment of this application. The forwarding entry monitoring apparatus 1000 may be a second node, and can implement a function of the second node in the method provided in the embodiments of this application. Alternatively, the forwarding entry monitoring apparatus 1000 may be an apparatus that can support the second node in implementing the function of the second node in the method provided in the embodiments of this application. The forwarding entry monitoring apparatus 1000 may be a chip system. In this embodiment of this application, the chip system may include a chip, or may include a chip and another discrete component.

The forwarding entry monitoring apparatus 1000 includes at least one processor 1020, configured to implement or support the apparatus in implementing the function of the second node in the method provided in the embodiments of this application. For example, the processor 1020 may determine a monitored data stream, a first node, and a transmission path of the data stream. For example, the processor 1020 is configured to determine the monitored data stream based on a first instruction, determine the first node based on a forwarding entry, and determine the transmission path of the data stream based on a first packet fed back by the first node and/or a third packet fed back by a third node. For details, refer to detailed descriptions in the method example. Details are not described herein again.

The forwarding entry monitoring apparatus 1000 may further include at least one memory 1030, configured to store a program instruction and/or data. The memory 1030 is coupled to the processor 1020. The coupling in this embodiment of this application is an indirect coupling or a communication connection between apparatuses, units, or modules, may be in an electrical form, a mechanical form, or another form, and is used for information exchange between the apparatuses, the units, and the modules. The processor 1020 may operate with the memory 1030. The processor 1020 may execute the program instruction stored in the memory 1030. When executing the program instruction in the memory 1030, the processor 1020 may implement the function of the second node in the embodiment shown in FIG. 4. At least one of the at least one memory may be included in the processor.

The forwarding entry monitoring apparatus 1000 may further include a communications interface 1010, configured to communicate with another device through a transmission medium, so that an apparatus in the device monitoring apparatus 1000 may communicate with the another device.

For example, the another device may be a terminal device. The processor 1020 may receive and send data through the communications interface 1010, and may implement the method performed by the second node in the embodiment corresponding to 4.

In this embodiment of this application, a specific connection medium between the communications interface 1010, the processor 1020, and the memory 1030 is not limited. In this embodiment of this application, the memory 1030, the processor 1020, and the communications interface 1010 are connected through a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or a transistor logic device, or a discrete hardware component, and can implement or perform the methods, operations, and logical block diagrams disclosed in the embodiments of this application. The general-purpose processor may be a microprocessor or any conventional processor or the like. The operations of the method disclosed with reference to the embodiments of this application may be directly performed by a hardware processor, or may be performed by a combination of hardware and software modules in the processor.

In this embodiment of this application, the memory 1030 may be a non-volatile memory such as a hard disk drive (HDD) or a solid-state drive (SSD), or may be a volatile memory such as a random access memory (RAM). The memory is any other medium that can be configured to carry or store expected program code in a form of an instruction or a data structure and that can be accessed by a computer. However, the memory is not limited thereto. The memory in this embodiment of this application may alternatively be a circuit or any other apparatus that can implement a storage function, and is configured to store the program instruction and/or the data.

An embodiment of this application further provides a computer-readable storage medium, including an instruction. When the instruction is run on a computer, the computer is enabled to perform the method performed by the first node in FIG. 4.

An embodiment of this application further provides a computer-readable storage medium, including an instruction. When the instruction is run on a computer, the computer is enabled to perform the method performed by the second node in FIG. 4.

An embodiment of this application provides a chip system. The chip system includes a processor, may further include a memory, and is configured to implement a function of the first node in the foregoing methods. The chip system may include a chip, or may include a chip and another discrete component.

An embodiment of this application provides a chip system. The chip system includes a processor, may further include a memory, and is configured to implement a function of the second node in the foregoing methods. The chip system may include a chip, or may include a chip and another discrete component.

An embodiment of this application provides a system. The system includes the first node and the second node described above.

All or some of the foregoing methods in the embodiments of this application may be implemented through software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedure or functions according to the embodiments of the present application are all or partially generated. The computer may be a general-purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

A person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A forwarding entry monitoring method, comprising:
   receiving, by a second node, a first instruction to instruct the second node to monitor whether a forwarding entry on a transmission path of a data stream changes, wherein the forwarding entry is used to forward the data stream, and the first instruction carries an identifier of the transmission path of the data stream;
   determining, by the second node, a first node based on a forwarding entry stored on the second node, wherein the first node is a next-hop node of the second node on the transmission path and the second node is a previous-hop node of the first node;
   receiving, by the first node, a second packet from the second node through a transmission path of a data stream, wherein the second packet is used to obtain status information of a first forwarding entry, and the status information is used to indicate whether the first forwarding entry changes;
   determining, by the first node, a data stream to be monitored based on a parameter carried in the second packet;
   determining, by the first node, that a stored forwarding entry changes, wherein the forwarding entry is used to forward the data stream;
   sending, by the first node, a first packet to the second node located on a transmission path of the data stream; and
   receiving, by the second node, the first packet generated by the first node and a third packet generated by a third node, wherein the first packet carries a first change indication used to indicate whether the first forwarding entry changed, the third packet is used to carry a second change indication used to indicate whether a second forwarding entry stored on the third node changed, the second forwarding entry is used by the third node to forward the data stream, and the third node is a next-hop node of the first node on the transmission path and determining, by the second node, based on the first packet and the third packet, a transmission path used to forward the data stream.

2. The method according to claim 1, wherein the first change indication is used to indicate that the first forwarding entry changes, or the first change indication is used to indicate changed content in the first forwarding entry.

3. The method according to claim 1, wherein the first packet further carries a node identifier of the first node and a node identifier of the second node.

4. The method according to claim 1, wherein sending a first packet to a second node comprises:
   sending, by the first node, the first packet to the second node through a first channel that is different from the transmission path of the data stream.

5. The method according to claim 1, wherein the parameter carried in the second packet comprises an identifier of the transmission path of the data stream.

6. The method according to claim 1, wherein the first node, the second node, and the third node are nodes located in an autonomic networking integrated model and approach (ANIMA) domain.

7. A forwarding entry monitoring method, comprising:
   receiving, by a second node, a first instruction to instruct the second node to monitor whether a forwarding entry on a transmission path of a data stream changes, wherein the forwarding entry is used to forward the data stream, and the first instruction carries an identifier of the transmission path of the data stream;
   determining, by the second node, a first node based on a forwarding entry stored on the second node, wherein the first node is a next-hop node of the second node on the transmission path and the second node is a previous-hop node of the first node;
   sending, by the second node, a second packet to the first node to obtain status information of a first forwarding entry stored on the first node, wherein the status information is used to indicate whether the first forwarding entry changes, and the first forwarding entry is used by the first node to forward the data stream; and
   receiving, by the second node, a first packet generated by the first node and a third packet generated by a third node, wherein the first packet carries a first change indication used to indicate whether the first forwarding entry changed, the third packet is used to carry a second change indication used to indicate whether a second forwarding entry stored on the third node changed, the second forwarding entry is used by the third node to forward the data stream, and the third node is a next-hop node of the first node on the transmission path and determining, by the second node based on the first packet and the third packet, a transmission path used to forward the data stream.

8. The method according to claim 7, wherein the first packet further carries a node identifier of the second node and a node identifier of the first node, and the third packet further carries the node identifier of the first node and a node identifier of the third node.

9. The method according to claim 7, further comprising at least one of:
- determining, by the second node based on the first change indication, that a change of the first forwarding entry meets a preset condition, and outputting, by the second node based on the first packet, prompt information to remind the change, wherein the preset condition comprises a condition under which transmission of the data stream is interrupted; or
- determining, by the second node based on the second change indication, that a change of the second forwarding entry meets a preset condition, and outputting, by the second node based on the third packet, prompt information to remind the change, wherein the preset condition comprises the condition under which transmission of the data stream is interrupted.

10. A forwarding entry monitoring apparatus, comprising:
a processor; and
a memory storing instructions, which when executed by the processor, cause the processor to
receive a second packet from a second node through a transmission path of a data stream, wherein the second packet is used to obtain status information of a first forwarding entry, and the status information is used to indicate whether the first forwarding entry changes;
determining a data stream to be monitored based on a parameter carried in the second packet;
determining that a stored forwarding entry changes, wherein the forwarding entry is used to forward the data stream;
sending a first packet to the second node located on a transmission path of the data stream and sending the second packet to a third node, wherein the apparatus is a first node that is a next-hop node of the second node and the second node is a previous-hop node of the first node, and the first packet carries a change indication, and wherein, the second node receives the first packet generated by the first node and a third packet generated by the third node, wherein the first packet carries a first change indication used to indicate whether the first forwarding entry changed, the third packet is used to carry a second change indication used to indicate whether a second forwarding entry stored on the third node changed, the second forwarding entry is used by the third node to forward the data stream, and the third node is a next-hop node of the first node on the transmission path.

11. The apparatus according to claim 10, wherein the first change indication is used to indicate changed content in the first forwarding entry.

12. The apparatus according to claim 10, wherein the first packet further carries a node identifier of the apparatus and a node identifier of the second node.

13. The apparatus according to claim 10, wherein the instructions further cause the processor to:
send the first packet to the second node through a first channel, wherein the first channel is different from the transmission path of the data stream.

14. The apparatus according to claim 13, wherein the parameter carried in the second packet comprises an identifier of the transmission path of the data stream.

* * * * *